United States Patent [19]

MacChesney et al.

[11] Patent Number: 4,666,247

[45] Date of Patent: May 19, 1987

[54] MULTICONSTITUENT OPTICAL FIBER

[75] Inventors: John B. MacChesney, Lebanon; Jay R. Simpson, Fanwood, both of N.J.

[73] Assignee: American Telephone and Telegraph Company, AT&T Bell Laboratories, Murray Hill, N.J.

[21] Appl. No.: 699,669

[22] Filed: Feb. 8, 1985

[51] Int. Cl.$^4$ .............................................. G02B 6/16
[52] U.S. Cl. ................... 350/96.34; 65/3.12; 350/96.33
[58] Field of Search ............... 350/96.29, 96.30, 96.31, 350/96.33, 96.34; 65/3.11, 3.12

[56] References Cited

U.S. PATENT DOCUMENTS

| 4,336,049 | 6/1982 | Takahashi et al. | 65/3.12 |
| 4,418,985 | 12/1983 | Kasori et al. | 350/96.34 |
| 4,573,762 | 3/1986 | Joormann et al. | 350/96.34 |

OTHER PUBLICATIONS

*Proceedings of the IEEE,* vol. 68, No. 10, Oct. 1980, "Materials and Processes for Preform Fabrication—Modified Chemical Vapor Deposition and Plasma Chemical Vapor Deposition", by J. B. MacChesney, pp. 1181–1184.
*Proceedings of the IEEE,* vol. 68, No. 10, Oct. 1980, "Materials and Processes for Fiber Preform Fabrication—Vapor-Phase Axial Deposition", by T. Izawa et al, 1184–1187.
*Proceedings of the IEEE,* vol. 68, No. 10, Oct. 1980, "Fabrication of Optical Waveguides by the Outside Vapor Deposition Process", by P. C. Schultz, pp. 1187–1190.
*Proceedings of the IEEE,* vol. 68, No. 10, Oct. 1980, "Multicomponent Glass Fibers for Optical Communications", by K. J. Beales et al, pp. 1191–1194.
*Japanese Journal of Applied Physics,* vol. 21, No. 6, Jun. 1982, "Preparation of Nd-Doped SiO$_2$ Glass by Plasma Torch CVD", by H. Namikawa et al, pp. L360–L362.
*The Soviet Journal of Glass Physics and Chemistry,* vol. 6(1), 1980, "Metastable Liquid-Phase Separation in the Nd$_2$O$_3$–Al$_2$O$_3$–SiO$_2$ System", by F. Ya. Galakhov et al., pp. 34–37.
*Proceedings of the Society of Photo-Optical Instrumentation Engineers,* Aug. 1984, San Diego, California, "New Source Compounds for Fabrication of Doped Optical Waveguide Fibers", by D. A. Thompson et al, pp. 170–173.
*Inorganic Glass-Forming Systems* (1967), by H. Rawson, pp. 16–17, and p. 74.
*Angewandte Chemie,* vol. 15(12), "Gaseous Chloride Complexes with Halogen Bridges—Homo-Complexes and Hetero-Complexes", by H. Schäfer, pp. 713–727, (1976).

*Primary Examiner*—John Lee
*Attorney, Agent, or Firm*—Eugen E. Pacher

[57] ABSTRACT

Silica-based optical fiber comprising at least a core and a cladding surrounding the core, both core and cladding material produced by a vapor phase deposition process. The core and/or the cladding comprise at least two substituents, one chosen from Li, Na, K, Rb, Cs, Be, Mg, Ca, Sr, Ba, and the 4f-type rare earths (the "modifiers"), and the other chosen from B, Al, Ga, In, P, As, and Sb (the "homogenizers"). The maximum concentration of the substituents in the fiber is such that $3 < (n_1M + n_2H)/H < 20$, preferably $< 10$, where $n_1$ and $n_2$ are the valences of the modifier and the homogenizer, respectively, and M and H are the concentration, in mole %, of modifier and homogenizer, respectively. Fiber according to the invention comprises at least 50, frequently more than 80% by weight, SiO$_2$, and further has a maximum modifier concentration of at least 0.2 mole %, preferably at least 1 mole %. The presence of homogenizer frequently permits achievement of modifier concentrations that lead to phase separation or crystallization in prior art fibers. Disclosed is also a method for producing optical fiber, the method comprising forming a metal halide complex having a relatively high vapor pressure.

8 Claims, 3 Drawing Figures

MULTICONSTITUENT OPTICAL FIBER

FIELD OF THE INVENTION

This invention pertains to silica-based optical fiber in which either the core, the cladding, or both have a refractive index different from that of pure silica, due to the presence of appropriate index-modifying elements.

BACKGROUND OF THE INVENTION

Silica-based optical fiber is widely used in optical telecommunications, where it constitutes the currently preferred transmission medium. Such fiber also has other uses, e.g., in sensor applications, or as an optical gain medium.

Optical fibers comprise a core and at least one cladding, with the cladding having an index of refraction lower, at least in part, than the effective index of refraction associated with the core. Both multimode fibers and single mode fibers are routinely fabricated.

Dopants used in silica-based communications fibers include germania, an index-raising dopant, which is currently the principal and most widely used dopant, as well as other dopants such as phosphorus and other index-raising dopants, and the index-lowering dopants, fluorine and boron. Boron and phosphorus are also used to improve processing characteristics, such as those associated with sintering, and B and possibly others, can be used to produce anisotropic stress. Ge is a relatively costly dopant of limited abundance in nature, and it would be desirable to find acceptable less expensive and more abundant alternative dopants, especially for multimode communications fibers.

The use of alumina as a dopant has been specifically investigated, and although the presence of higher concentrations (e.g., greater than about 5 mole %) of alumina in vitreous silica was known to generally result in devitrification, it has recently been disclosed that co-doping with phosphorus permits alumina doping in excess of 5 mole % without devitrification. See, U.S. patent application Ser. No. 527,970, (now U.S. Pat. No. 4,616,901) a continuation-in-part of U.S. patent application Ser. No. 367,091, filed Apr. 9, 1982, (now abandoned) co-assigned with this, and incorporated herein by reference.

The literature is replete with suggestions of various dopants for use in the fabrication of optical fibers. However, despite the fact that the list of disclosed possible dopants of silica is long, the number of elements that have actually been found useful for producing high-silica optical fiber by a vapor phase deposition process, especially elements that can be incorporated at relatively high levels, typically higher than about 0.2 mole %, is really quite small. These elements include, in addition to the aforementioned elements Ge, B, Al, P, and F, also Zr and, possibly, Pb and Sn.

Several general techniques for producing optical fiber are known, but the currently most frequently used general technique, and the only one of interest herein, involves formation of glass by the reaction of one (or more) gaseous glass forming precursor compounds and one (or more) oxidizers at a relatively high temperature, e.g., 1800° C., and deposition of the amorphous reaction product onto a substrate. The reaction can take place in a confined space, e.g., inside a silica substrate tube, or it can take place in an unconfined manner, e.g., in or near the flame of a $O_2/H_2$ torch. Among the former methods are the modified chemical vapor deposition (MCVD) method, and various plasma deposition methods. Among the latter methods are the vapor axial deposition (VAD) method and the outside vapor phase oxidation (OVPO) method. These techniques ae well known to those skilled in the art, and do not need detailed review here. See, for instance, J. B. MacChesney, *Proceedings of the IEEE*, Vol. 68(10), (1980), pp. 1181–1184; T. Izawa et al, ibid, pp. 1184–1187; P. C. Schultz, ibid, pp. 1187–1191. We will refer to these processes herein collectively as vapor phase deposition (VPD) methods.

All of the VPD methods have the potential of producing glass of very low impurity content, and it would be highly desirable if the range of dopant elements that can actually be used in such processes could be increased from the presently small number. For instance, the ability to incorporate more than minor amounts of 4f-type rare earths into silica would be of considerable interest, e.g., for sensor or laser applications, and possibly to reduce radiation sensitivity of communications fiber. However, attempts in this direction have typically not been successful. For instance, H. Namikawa et al, *Japanese Journal of Applied Physics*, Part 2, Vol. 21(6), pp. L360–L362 (1982), indicate that silica glass containing 0.25 mole % and more, of $Nd_2O_3$ shows opalescence. Similarly, D. A. Thompson et al, *Proceedings of the Society of Photo-Optical Instrumentation Engineers*, August 1984, San Diego, Calif., pp. 170–172, report that silica glass containing 0.4 wt. % $CeO_2$ opalesces, the opalescence being due to the presence of droplets of a second phase. It is probably obvious that glass that opalesces or is otherwise not single phase is unsuitable for many lightguide applications (e.g., as communications fiber) due to the generally unacceptably high scattering losses associated with such structure.

The rare earths are not the only group of elements that contain potentially useful dopants for optical fiber applications. For instance, the alkalis and alkaline earths also are of potential interest.

Not only can incorporation into vitreous silica of many of the above elements lead to devitrification or opalescence, it is also found that halogen compounds of these elements, the types of compounds typically used as gaseous reactants in VPD processes, frequently have a relatively low vapor pressure. This low vapor pressure typically makes impractical the use of these compounds in standard VPD glass forming processes.

A cerium compound that can be useful as a precursor material in VPD has been disclosed in the above cited paper by D. A. Thompson et al. The compound is a volatile and thermally stable beta diketonate complex of cerium that probably cannot easily be prepared in situ. However, it would clearly be desirable to have available means for easily and simply producing in situ high vapor pressure halogen compounds of the potentially useful silica dopants, since this would facilitate the production of optical fibers of novel compositions by standard VPD processes.

A method for producing multicomponent glass fiber preforms by a modified VPD process is disclosed in U.S. Pat. No. 4,336,049. The patent teaches that gaseous glassforming precursor $SiCl_4$ (and, if desired, one or more of $GeCl_4$, $POCl_3$, $BBr_3$), mixed with a carrier gas is fed into a mixing region, that an aqueous solution of one or more metal salts (alkali metals, alkaline earths, lead, or lanthanum) is nebulized and the thus formed aerosol also introduced into the mixing region, were the mixture is reacted in an oxygen/hydrogen flame. The glassy reaction product is deposited on an adjacent substrate.

The literature is replete with information on multicomponent glasses comprising silica, including glasses comprising rare earths, alkalis, alkaline earths, and other elements of interest herein. However, these prior art glasses generally contain much lower percentages of silica (and therefore have such lower softening and working temperatures) than the glasses of concern herein. However, see, for instance, F. Ya. Galakhov et al, *The Soviet Journal of Glass Physics and Chemistry*, Vol. 6(1), pp. 34–37 (1980), who report on phase separation in the silica-rich part of the $SiO_2$-$Nd_2O_3$-$Al_2O_3$ system, and indicate that $Al_2O_3$ is a homogenizing agent of liquid-liquid separated glass of the type $RO(R_2O)$-$SiO_2$. Futhermore, prior art multicomponent glasses generally are not produced by a VPD process. See, for instance, K. J. Beales et al, *Processing of the IEEE*, op. cit., pp. 1191–1194. Thus it appears unlikely that such glasses could be produced economically and conveniently in the high purity typically required for commumications grade and other fibers.

The methods used to produce the prior art multicomponent glasses typically do not make as severe demands on the "glassiness" (see, H. Rawson, *Inorganic Glass-Forming Systems*, Academic Press, page 74, for a discussion of this term) of the compositions, as do at least some of the standard VPD processes. For instance, outside deposition processes, such as VAD and OVPO, are thought to demand use of glass having high "glassiness", since these processes result in formation of a porous body that has to be dehydrated and sintered to form therefrom a homogeneous low loss glass. This dehydration and sintering requires maintenance of the body at a high temperature, e.g., 700°–1450° C., for a substantial period of time, typically many hours. It is this heat treatment which frequently results in phase separation and/or crystallization. However, similar phenomena have also been observed in glass produced by MCVD, a process that does not require the extended heat treatment described above.

Silica-based optical fiber, produced by means of a VPD process and containing substantial amounts of alkali metal, alkaline earth or rare earth is of substantial technological and scientific interest, due, inter alia, to potentially significant cost saving over Ge-doped fiber, possible novel sensor applications, as an optical gain medium, as a radiation-hardened fiber, birefringent fiber, and because the presence of Ge in the core is correlated with the presence of loss in fibers exposed to $H_2$. We are disclosing herein fiber compositions that can contain significant amounts of one or more of these elements. We are also disclosing a technique for producing such fiber economically and conveniently, by delivering the substituent as an easily formed high vapor pressure compound to the reaction zone.

SUMMARY OF THE INVENTION

We are disclosing silica-based optical fiber comprising a core and at least one cladding surrounding the core, with core and/or cladding comprising vitreous silica and at least two substituent elements. One of the substituent elements is selected from the group consisting of Li, Na, K, Rb, Cs, Be, Mg, Ca, Sr, Ba, and the 4f-type rare earths (atomic number 57–71), and the other substituent element from the group consisting of B, Al, Ga, In, P, As and Sb. The elements of the former group will be referred to herein as modifiers, and the elements of the latter group as homogenizers. The substituent concentrations are to be chosen such that at least in the region of maximum modifier concentration $$3 < (n_1 M + n_2 H)/H < 20,$$

where M and H are the concentrations (in mole %) of modifier and homogenizer, respectively, and $n_1$ and $n_2$ are the valences of modifier and homogenizer, respectively. The expression can be extended in an obvious way if more than one element from a category is present.

Fiber according to the invention comprises everywhere more than about 50 mole % $SiO_2$, but in many cases the $SiO_2$ content of the most heavily substituted fiber region is at least about 80 mole %. The modifier concentration in the fiber region of maximum modifier content (e.g., the center region of the core) is greater than 0.2 mole %, typically greater than 0.5 or 1 mole %. It is currently thought preferable if $(n_1 M + n_2 H)/H < 10$.

A significant aspect of the invention is the discovery that it is possible to substantially increase the concentration of many substituents (modifiers) in high-silica glass, produced by a VPD process, by concurrently incorporating an appropriate second substituent (a homogenizer) into the glass. A possible explanation for the observed increased glassiness of fiber according to the invention will be offered below.

Communications fiber according to the invention has a loss of at most 10 dB/km, preferably less than 5 or 2 dB/km, at least at some wavelength in the approximate wavelength region 0.5–1.6 μm. Noncommunications fiber (e.g., for sensors) need not necessarily have such low loss, and even losses of the order of 1 dB/m may be acceptable for some applications. Furthermore, the wavelength region of potential interest for noncommunications fiber extends from about 0.3 μm to about 1.6 μm.

We are also disclosing a method for, inter alia, producing fiber according to the invention. The method comprises maintaining a quantity of a relatively low vapor pressure (second) metal halide at an elevated temperature, typically above about 600° C., and contacting the second metal halide with the vapor of a relatively high vapor pressure (first) metal halide. This procedure results in formation of molecular complexes having a vapor pressure higher than the vapor pressure of the second metal halide (at a given temperature). The molecular complexes are than transported to a reaction zone by known means. In the reaction zone, a vapor comprising the molecular complexes, in addition to glassforming precursor compound(s), oxidizer(s), possibly other substituent compounds, diluents, etc., is reacted to form an amorphous reaction product which is deposited on a substrate, e.g., the inside of a silica tube.

The inventive method has wide applicability and is not restricted to producing optical fiber, a preferred use. In general, the first metal halide comprises a metal selected from Al, Ga, In, and possibly Sn, a halogen selected from Cl, Br, or I. Currently, aluminum chloride is the preferred first metal halide. The second metal halide comprises a metal selected from Li, Na, K, Rb, Cs, Be, Mg, Ca, Sr, Ba, Sc, Y, Ti, Zr, Hf, V, Nb, Ta, Cr, Mn, Fe, Ru, Co, Rh, Tr, Ni, Pd, Pt, Cu, Ag, Au, Zn, Cd, Hg, Tl, Sn, Pb, Bi, and the 4f-type rare earths. The second metal halide further comprises a halogen selected from Cl, Br, or I. Among preferred metals for use in optical fiber production are Li, Na, K, Rb, Cs, Be, Mg, Ca, Sr, Ba, and 4f-type rare earths. The preferred halogen is Cl.

The first metal halide can be formed in situ by a known process, or it can be derived from a previously formed compound, e.g., by heating of the compound. The first metal halide vapor is typically transported to the heated second metal halide through heated tubing. Typically a flow of inert gas is used to transport the halide vapors.

The invention method makes it possible to conveniently transport increased quantities of certain substituent elements to the reaction zone. This in turn allows, possibly in conjunction with the above disclosed use of a modifier and a homogenizer, incorporation of increased quantities of certain substituents into the glass.

DETAILED DESCRIPTION

Figure 1:
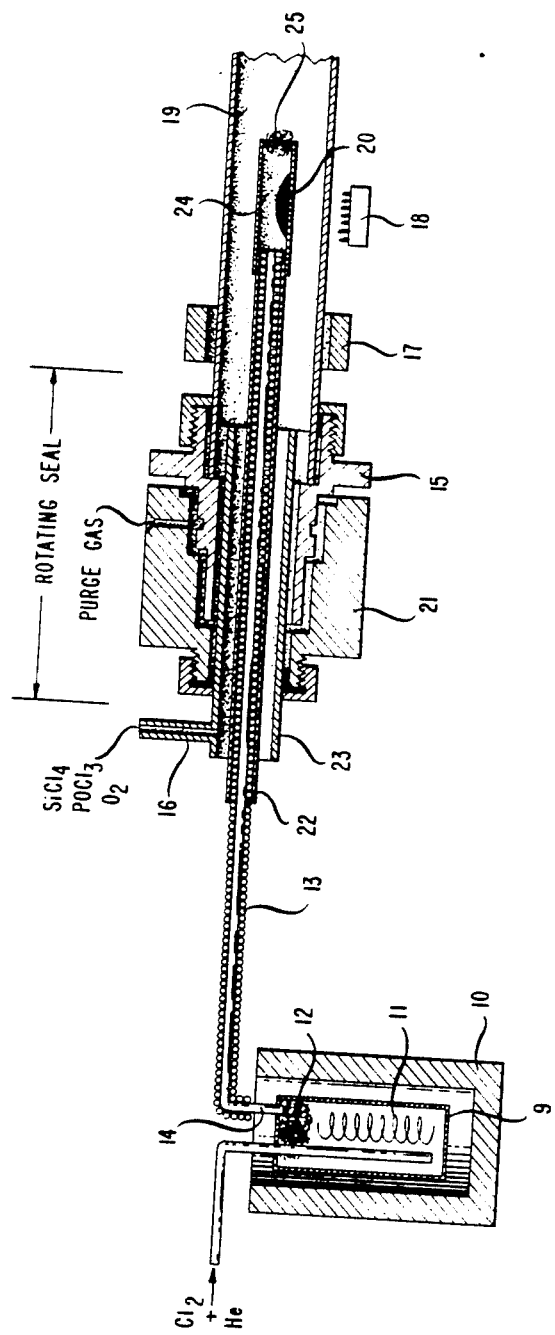
FIG. 1 schematically depicts exemplary apparatus for the practice of the invention.

Currently silica-based optical fiber generally comprises a core and a first cladding contactingly surrounding the core. Core and first cladding typically consist of glass formed by means of one of the VPD processes, with the effective refractive index of the core being greater than the effective refractive index of the cladding. As is well known, this difference in the refractive indices is due to a difference in chemical composition of the fiber regions, due in turn to a difference in chemical composition of the gas mixture that is fed into the reaction zone, for instance, by feeding $GeCl_4$, in addition to $SiCl_4$, $O_2$, and possibly carrier gas, into the reaction zone during deposition of core material. The reaction either takes place in an appropriate flame, or in a volume of space that is appropriately energized, either by a plasma or by an external heat source.

This process of changing the glass composition in usually referred to as "doping", in analogy with the practice in the semiconductor field. It appears, however, that practitioners in the fiber field at least implicitly consider the analogy between the semiconductor and fiber arts to go beyond use of this terminology, and neglect to appropriately take account of certain differences between semiconductors and vitreous silica.

As is well known, in semiconductors such as Si, there is only one possible type of lattice site into which a dopant atom can go—the dopant atom merely replaces a host atom. On the other hand, in high-silica glasses, there exist two types of possible sites for a "foreign" (not Si or O) atom, "network former" sites and "network modifier" sites. See, for instance, Rawson, op. cit., page 16. The former are the sites normally occupied by Si in vitreous $SiO_2$, whereas the latter are the interstitial sites, i.e., "holes" in the relatively open tetrahedral network structure (see, for instance, Rawson, op. cit., page 17 FIG. 5). It is submitted that current practice in the optical fiber field does not properly take into account this difference between semiconductors and high-silica glass.

We believe that proper exploitation of the availability of the two different types of sites for substituent atoms in high-silica glass can make possible the production by VPD processes of homogeneous (unitary) glass of compositions often heretofore not obtainable by such methods. We believe that this permits manufacture of optical fiber comprising high purity deposited glass of novel compositions.

We have discovered that it is possible to produce homogeneous (i.e., containing a single phase only) high-silica glass containing heretofore frequently unobtainable concentrations of certain substituent elements, by appropriately pairing substituents. A possible explanation of this experimental fact is as follows. Possible substituents can be divided into two classes, the first class to be referred to as "network modifiers", and the second class to be referred to as "homogenizers". Herein the class of network modifiers is considered to contain the alkalis and the alkaline earths (other than Fr and Ra, respectively) and the 4f-type rare earths (atomic numbers 57–71), the class of homogenizers is considered to contain the elements B, Al, Ga, In, P, As, and Sb. Network modifier elements are thought to typically preferentially locate in interstitial sites in high-silica glass, and homogenizers are thought to typically preferentially locate in network-former sites. However, some elements (e.g., B and Al), are currently thought to be able to locate in either site.

We have found that, by incorporating appropriate concentrations of one (or more) modifier elements (of valence $+n_1$) and of one (or more) homogenizer elements (of valence $+n_2$) into vitreous silica, it is possible to produce homogeneous high-silica glass with relatively high levels of substituents. A possible explanation is that atoms of the two types of substituents associate in such a fashion as to locally substantially preserve the tetrahedral coordination of the network. That is to say, it is possible that the substituents cluster such that locally the sum of the valences of the modifier ions and the homogenizer ions, divided by the number of homogenizer ions, on average equals about 4. Examples of the above are: $(Mg^{2+} + Al_2^{3+})C_4$, and $(Na^+ + Al^{3+})O_2$. In this context we mean by "locally" a volume containing a small number, typically not more than about 10 or 20, of silicon/oxygen tetrahedra.

The above is a possible explanation of the observed characteristics of glass according to the invention, but further research may lead to a different understanding. The practice of the invention is not considered to depend on the correctness of the discussed mechanism.

We are teaching that homogeneous multiconstituent silica-based glasses can be produced by VPD processes if the gaseous reactant mixture comprises at least one modifier species and at least one homogenizer species. Since vitreous silica has a massively defective structure, we currently believe that beneficial results can be obtained over a rather wide range of concentration ratios. For instance, we believe that realistically the reaction conditions can be chosen such that, in the region of the glass containing the greatest modifier concentration, $$3 < (n_1 M + n_2 H)/H < 20, \text{ preferably } < 10.$$

In this expression, both M and H are different from zero.

Inventive fibers are particularly well adapted for use as communications fibers, sensors, and optical gain media, since VPD processes lend themselves to the production of glass having a very low impurity content. If the substituents are chosen such that the fiber has low loss (<10, 5, or even 2 dB/km) at some appropriate wavelength in the 0.5–1.6 μm region, then the fiber may be advantageously used as a communications fiber. On the other hand, fibers having much higher loss, due to absorption by some substituent, may be useful in sensor applications and/or as a gain medium, since in such a case typically only a relatively short length of fiber is used. Although inventive fiber can comprise as little as 50 mole % $SiO_2$, we consider that preferred embodiments frequently will comprise at least 80 mole % $SiO_2$. It will be understood that the above $SiO_2$ concentrations refer to the region of the fiber containing the highest substituent concentration, frequently the core, or a part thereof, e.g., the central region of the core. Although fiber according to the invention can comprise alkali metals, it appears that the relevant reaction constants are such as to make it unlikely that substantial amounts of alkali metals can be incorporated into high-silica glass produced by VPD processes.

Although other approaches to the delivery of the modifier and homogenizer elements to the reaction zone in VPD processes may be employed (e.g., nebulizing an aqueous solution, as disclosed in U.S. Pat. No. 4,336,049, may be used in VAD and OVPC processes), for internal deposition processes such as MCVD and plasma deposition processes it is currently thought necessary to deliver the reactants in gaseous form, free of hydrogen impurities, to the reaction region. This, however, requires that suitable compounds of the glass-formers as well as of all the substituent elements exist. For a compound to be suitable in this context, inter alia, requires that it has a relatively high vapor pressure (typically greater than about 1 Torr at some temperature in the range from room temperature to about 600° C., preferably less than about 400° C.).

As is well known to those skilled in the art, the vapor pressure of many metal chlorides of interest herein in such lower than 1 Torr at all temperatures below about 600° C. However, metal chlorides are the preferred precursor compounds for forming vitreous silica and/or multiconstituent high silica glass by a VPD process, especially by inside VPD processes, because, inter alia, they can be delivered to the reaction zone free of hydrogen. Those few metal chlorides that are relatively volatile at or near room temperature (e.g., $SiCl_4$, $GeCl_4$, $AlCl_3$, $POCl_3$) are currently the precursors of choice for optical preform production by VPD processes.

We will next describe a method for producing, by any standard VPD process, an optical fiber preform. We believe, however, that the method has wider applicability, both in optical fiber manufacture and in other technologies.

The method comprises forming high vapor pressure metal halide complexes, and introducing the complexes into the reaction zone, together with standard glass-forming precursors, oxidizers, and, possibly, diluents, as are known to the practitioner. We will introduce the method by means of a specific example. This will be followed by a more general exposition.

FIG. 1 schematically depicts apparatus useful in the practice of the novel manufacturing method. A mixture of chlorine and helium (e.g., 50 cc/min and 300 cc/min, respectively) is introduced into chamber 9 of a generator of the type described in U.S. patent application Ser. No. 527,970 (now U.S. Pat. No. 4,616,901). The chamber is heated by means of reactor oven 10, and contains a quantity of aluminum wire (shot, pellets, etc.,) 11. The generator chamber is at a temperature of about 300° C. At this temperature essentially all of the chlorine introduced into the chamber reacts with the aluminum, forming, at least primarily, $Al_2Cl_6$. The gaseous reaction product (as well as He and possibly unreacted $Cl_2$) leave the chamber by means of tube 14, with a quantity of silica wool 12 placed to prevent introduction of particulates into the tubing. Tube 14 is maintained at some elevated temperature (e.g., about 200° C.) by means of heater 13, for instance, a heating tape. The heated tube is introduced into the interior of rotatable silica tube 19 through a rotating seal of the type disclosed in U.S. patent application Ser. No. 297,213 (now U.S. Pat. No. 4,526,599). Briefly, the seal comprises stationary member 21, attached to the stationary structure of a glassblower's lathe (not shown), and a rotatable member 15, with a clearance between 21 and 15. Purge gas, e.g., $O_2$, is flowed through the clearance space, to prevent entrance of ambient air into the reaction region inside tube 19. Reactant gases (e.g., $SiCl_4$, $POCl_3$, and $O_2$) are introduced into stationary tube 23, and thence into the interior of tube 19, by means of inlet 16. The portion of heater 13 that is inside 23 and 19 is surrounded by protective tube 22, and the interior of 23 is sealed against the ambient air by means not shown. Tube 19 is held by lathe head stock and chucks 17 and can thus be rotated. Heated tube 14 (preferably a silica tube) extends for a certain distance (e.g., 10 cm) beyond chuck 17. A fused quartz tubular chamber 24 is attached to the end of 14, and a quantity 20 of $NdCl_3$ powder placed inside 24, with a wad of silica wool 25 placed inside 24 to prevent entrance of particulates into the reaction zone located further downstream in 19. A ribbon heater 18 serves to maintain 24 and the metal chloride 20 contained therein at an appropriate elevated temperature, e.g., about 1000° C. The one stream from the reactor enters 24 and contacts the heated $NdCl_3$ powder (or liquid) contained therein, reacts with it in the essentially $O_2$-free atmosphere provided, forming complexes of type $NdAl_3Cl_{12}$, which have a vapor pressure that is many orders of magnitude higher than that of $NdCl_3$. The gaseous reaction product (as well as He, and possibly $Cl_2$ and unreacted aluminum chloride) enters 19 through 25, flows downstream with the other reactants, and participates in the glassforming reaction in the reaction zone, resulting in formation of amorphous reaction product containing Nd. In some cases, we have found it advantageous to contact the pool of molten $NdCl_3$ with silica wool, to increase the rate of complex formation. Other means for achieving this can be devised.

Figure 2:
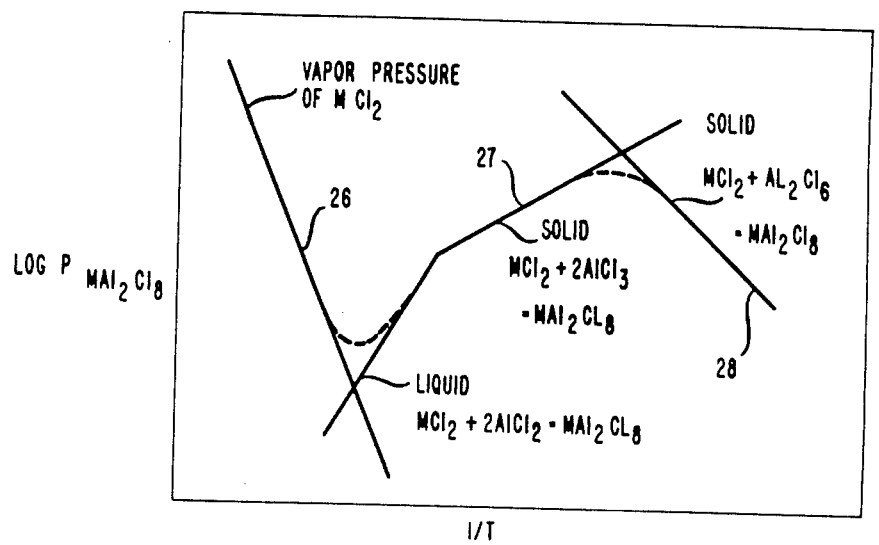
FIG. 2 is a generalized curve of vapor pressure versus inverse temperature, for compounds of the type discussed with regard to the inventive complexing technique.

FIG. 2 schematically illustrates the vapor pressure of metal halogens of the type discussed above, as a function of inverse temperature. In particular, in FIG. 2, the metal M is assumed to have valence 2+. However, this assumption was made only for ease of exposition, and similar relationships exist for metals of other valence, e.g., 1+ or 3+.

Segment 26 of the curve of FIG. 2 is the "low"-vapor pressure metal halide and segment 28 that of "high"-vapor pressure solid in which the dimer $Al_2Cl_6$ forms complexes with the metal chloride $MCl_2$. At intermediate temperatures the quantity of M in the vapor phase diminishes, as shown by segment 27. The change-over from curve 26 to 27 typically occurs in the temperature range 700°–1000° C. Information on complex formation of the type described can be found in H. Schaefer, *Angewandte Chemie*, Vol. 15(12), pp 713–727 (1976).

Figure 3:
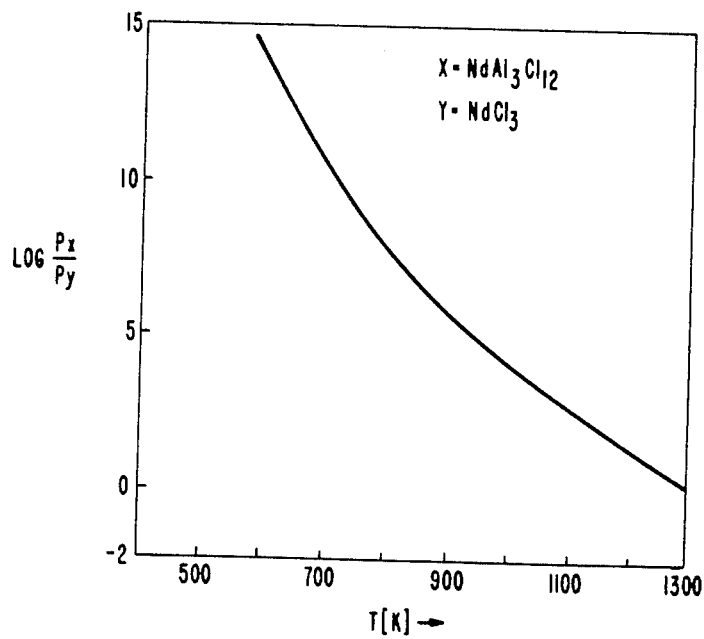
FIG. 3 shows the ratio of the vapor pressures of two exemplary compounds, as a function of temperature.

FIG. 3 exemplifies the increase in vapor pressure obtainable by complexing of the type discussed. In particular, the curve represents the ratio of the vapor pressures of $NdAl_3Cl_{12}$ and $NdCl_3$, respectively, as a function of the absolute temperature. As can be seen from FIG. 3, at about 700° C., the vapor pressure of the complex is about $10^{10}$ larger than that of $NdCl_3$.

The technique can be used to produce optical fibers by any of the conventional VPD processes. Such processes require (in the case of inside deposition processes), or typically use, (in the case of VAD and OVPO) vapor transport of reactants and substituents into the reaction zone. However, many potentially useful substituents could not be used in these processes because the vapor pressure of the metal halides is too low. The complexing technique disclosed herein allows use of these substituents, thereby greatly increasing the range of high silica glass compositions that can be produced by VPD processes.

Among the (second) metal halides to which the complexing techniques is currently thought preferably applicable are the alkalis Li, Na, K, Rb and Cs; the alkaline earths Be, Mg, Ca, Sr, and Ba; and the 4f-type rare earths (atomic numbers 57-71). The complexing technique is also applicable to the halides of Sc, Ti, V, Cr, Mn, Fe, Co, Ni, Cu, Zn, Y, Zr, Nb, Ru, Rh, Pd, Ag, Cd, Hf, Ta, Ir, Pt, Au, Hg, Tl, Pb, Bi, and possibly other metals, although at least some of these elements (e.g., Fe) are generally considered to be undesirable impurities in low loss silica-based optical fibers.

The complexing technique can, in principle, be practiced with compounds of the above metals with Cl, Br, or I, with Cl being currently preferred. The (first) metal halides used to form the complexes are halides of Al, Ga, In, and Sn with Cl, Br, or I, with Al and Cl being currently preferred.

The (first) metal halide vapor can be produced in situ, in a reactor maintained typically above about 150° C., by a reaction of the type $2M + nCl_2 \rightarrow 2MCl_n$, or it can be produced from the previously prepared compound $MCl_n$. In the former case, a reactor of the type shown in FIG. 1 can be advantageously used. In the latter case, it is expected to be merely necessary to heat a sample of $MCl_n$ to an appropriate temperature, typically above 150° C. In both cases, a carrier gas such as He is advantageously used to effect the transport of the first metal halide vapor, typically through heated tubing. It is advisable to use inert and noncontaminating tubing material, e.g., vitreous silica (for use above about 100° C.) and polytetrafluorethylene, and to keep the vapor stream containing the first (and, further downstream, the third) metal halide separate from the vapor stream containing the glassforming precursor, oxidizer, and perhaps other substituent precursor.

The (second) metal halide is maintained, by any convenient means, at a temperature which results in the appropriate concentration of the metal in the reaction zone. No absolute temperature limits can be prescribed, due to the variety of elements to which the technique is applicable. However, at least for some chlorides, we consider the range 600°-1200° C. to be potentially appropriate. It will be an easy matter for the practitioner to determine the optimal temperature for any desired compound and substituent concentration.

We will next give some examples. In all of the examples, the fiber preform was prepared by MCVD, depositing the reaction product on the inside of a commercially obtained vitreous silica tube, using procedures well known to those skilled in the art.

EXAMPLE I

A preform according to the invention was prepared, using the following deposition parameters:
cladding:
  4 passes;
  $SiCl_4$: 3.0 grams/min
  $SiF_4$: 300 cc/min
  $O_2$: 1982 cc/min
core:
  5 passes, 1600°-1650° C.;
  $SiCl_4$: 0.31 grams/min
  $O_2$: 1250 cc/min In addition, a flow of Mg/Al-chloride complexes into the reaction zone was maintained during core deposition. Flow into the $Al_2Cl_6$ reactor (about 300° C.) was 25 cc/min of $Cl_2$ and 350 cc/min of He; the reactor outflow contacted $MgCl_3$ heated to about 1000° C. This was carried out in apparatus substantially as shown in FIG. 1. The preform had a maximum refractive index difference ($\Delta M_{max}$) of about 0.02, and the previously defined expression $(2M+3H)/H$ had an estimated value of about 4 in the core deposit. The composition was estimated from emission spectroscopy to have been 5% $Mg_o$, 10% $Al_2O_3$, 85% $SiO_2$ (mole %).

A preform was prepared, using similar procedures, but without introducing any Mg into the reaction zone. No cladding was deposited, the core ($\Delta N_{max=0.02}$) deposition conditions were:
17 passes, 1650°-1800° C.;
$SiCl_4$: 1.5 gms/min
$O_2$: 2680 cc/min The Al-concentration in the reaction zone was increased in three steps, by varying the $Cl_2$ flow into the reactor, as follows:
9 passes, $Cl_2$: 10 cc/min
5 passes, $Cl_2$: 30 cc/min
3 passes, $Cl_2$: 50 cc/min
for all passes, He: 200 cc/min.

Both preforms were heated to 1200° C. for one hour. The Mg-free preform became opalescent throughout, whereas the preform according to the invention remained free of opalescence, except near the ends of the preform.

EXAMPLE II

A preform according to the invention contained Ce and Al ($\Delta N=0.006$), and was formed using the following deposition parameters:
Cladding:
  10 passes
  $SiCl_4$: 1.5 gms/min
  $SiF_4$: 200 cc/min
  $O_2$: 1741 cc/min
Core:
  3 passes
  $SiCl_4$: 0.75 gms/min
  $O_2$: 1620 cc/min
$Al_2Cl_6$ reactor:
  $Cl_2$: 20 cc/min
  He: 350 cc/min
About 10 gms of $CeCl_3$ were heated to about 1000° C.

The $Ce_2O_3$ concentration in the core deposit was determined (by absorption at 0.295 μm) to be about 0.1 weight %. By contacting the molten $CeCl_3$ with silica wool (thereby greatly increasing the surface area of CeCl$_3$) the Ce$_2$O$_3$ concentration can be increased to about 1 weight %, with (3M+3H)/H then estimated to be 3.4.

A similarly prepared preform ($\Delta$N=0.0045) that did not contain Al (350 cc/min of He flowed over CeCl$_3$ heated to about 1000° C.) had a measured Ce$_2$O$_3$ concentration of about 7.3·10$^{-5}$ weight %.

EXAMPLE III

A preform ($\Delta$N=0.017) containing Nd and Al was prepared substantially as described.
cladding:
  8 passes
  SiCl$_4$: 1.5 gms/min
  SiF$_4$: 200 cc/min
  O$_2$: 1741 cc/min
core:
  2 passes
  SiCl$_4$: 0.75 gms/min
  O$_2$: 1620 cc/min
Al$_2$Cl$_6$ reactor:
  He: 250 cc/min
  Cl$_2$: 34.6 cc/min
About 10 gms of NdCl$_3$ were heated to about 1000° C.

The Nd$_2$O$_3$ concentration was measured by emission spectroscopy to be 0.65 weight %, with (3M+3H)/H estimated to be about 3.2.

A similarly prepared preform ($\Delta$N=0.0045) that did not contain Al (143 cc/min of He flowed over NdCl$_3$ heated to about 1000° C.) had a measured Nd$_2$O$_3$ content of 10$^{-4}$ weight %.

EXAMPLE IV

A multimode preform is prepared substantially as described above, and fiber drawn therefrom. The fiber core contains about 0.2 weight % Ce$_2$O$_3$ and about 4 weight % Al$_2$O$_3$. The fiber has a loss less than 10 dB/km at 1.3 $\mu$m.

What is claimed is:

1. Optical fiber comprising a core and at least a first cladding contactingly surrounding the core, at least the material of the core and of the first cladding being glass produced by a vapor phase deposition process, the glass of the core and the first cladding comprising everywhere at least 50% by weight SiO$_2$, with at least one of the core and first cladding further comprising at least one element selected from the group consisting of Li, Na, K, Rb, Cs, Be, Mg, Ca, Sr, Ba, and the 4f-type rare earths (atomic number 57–71), these elements to be referred to as "modifiers", and at least one element selected from the group consisting of B, Al, Ga, In, P, As, and Sb, these elements to be referred to as "homogenizers", the maximum modifier concentration in the core or first cladding being at least 0.2 mole %, the homogenizer concentration chosen such that in at least the region of maximum modifier concentration $$3 < (n_1M + n_2H)/H < 20,$$

where M and H are modifier and homogenizer concentrations, respectively, in mole %, and n$_1$ and n$_2$ are the modifier and homogenizer valences, respectively.

2. Optical fiber of claim 1, wherein the modifier is selected from the group consisting of Mg, Ca, Sr, Ba, and the 4f-type rare earths, and the homogenizer is selected from the group consisting of Al, Ga, and In.

3. Optical fiber of claim 1, wherein the glass of the core and the cladding comprises everywhere at least about 80% by weight SiO$_2$.

4. Optical fiber of claim 1, wherein the fiber is communications-grade fiber having a transmission loss, at least at one wavelength in the wavelength range 0.5 $\mu$m–1.5 $\mu$m, of less than 10 dB/km.

5. Optical fiber of claim 4, wherein the modifier is selected from the group consisting of Mg, Ca, and the 4f-type rare earths and the homogenizer is Al.

6. Optical fiber of claim 1, wherein the maximum modifier concentration is at least 1 mole %.

7. Optical fiber of claim 1, wherein $3 < (n_1M + n_2H)/H < 10$.

8. Optical fiber of claim 1, wherein the fiber is produced by a vapor deposition process comprising nebulizing a liquid comprising at least one element selected from the group consisting of the modifiers and the homogenizers.

* * * * *